United States Patent [19]

Kubelik

[11] Patent Number: 4,891,656

[45] Date of Patent: Jan. 2, 1990

[54] PRINT CARTRIDGE WITH NON-DIVERGENT ELECTROSTATIC FIELD

[75] Inventor: Igor Kubelik, Mississauga, Canada

[73] Assignee: Delphax Systems, Mississauga, Canada

[21] Appl. No.: 284,268

[22] Filed: Dec. 14, 1988

[51] Int. Cl.[4] .............................................. G01D 15/00

[52] U.S. Cl. ..................................... 346/155; 346/159

[58] Field of Search ........... 346/155, 159, 158, 139 C; 358/300; 400/119

[56] References Cited

U.S. PATENT DOCUMENTS

| | | | |
|---|---|---|---|
| 4,155,093 | 5/1979 | Fotland et al. | 346/159 |
| 4,160,257 | 7/1979 | Carrish | 346/159 |
| 4,408,214 | 10/1983 | Fotland | 346/159 |
| 4,409,604 | 10/1983 | Fotland | 346/159 |
| 4,426,654 | 1/1984 | Tarumi et al. | 346/159 |
| 4,558,334 | 12/1985 | Fotland | 346/159 |
| 4,628,227 | 12/1986 | Briere | 346/158 |
| 4,679,060 | 5/1987 | McCallum et al. | 346/159 |
| 4,691,213 | 9/1987 | Iuada et al. | 346/154 |
| 4,745,421 | 5/1988 | McCallum et al. | 346/158 |
| 4,819,013 | 4/1989 | Beaudet | 346/155 |

*Primary Examiner*—Arthur G. Evans
*Attorney, Agent, or Firm*—Rogers & Scott

[57] ABSTRACT

There is disclosed a print cartridge for use in charge transfer imaging comprising first and second electrodes on opposite sides of a layer of dielectric material. The first electrodes extend in a first direction and the second electrodes extend in a second direction, and edge structures are provided in the second electrodes at the locations where the electrodes cross. Various structures are described designed to improve the pattern of charge transfer to a receptor to enhance the accuracy of the image and the efficiency of the transfer.

18 Claims, 8 Drawing Sheets

PRINT CARTRIDGE WITH NON-DIVERGENT ELECTROSTATIC FIELD

FIELD OF INVENTION

This invention relates to charge transfer imaging and more particularly to printers utilizing charge transfer imaging and to print cartridges used in such printers.

DESCRIPTION OF PRIOR ART

In charge transfer imaging, a pattern of charge corresponding to a desired image is formed as a latent charge image on a dielectric surface such as the surface of a print drum or image cylinder. The dielectric surface is then moved past a toner brush to cause toner of opposite charge to adhere to charged areas of the dielectric surface, and thus, to form a toner image. The toner image then passes through a nip between the drum and a pressure roller and is transferred and fused simultaneously, or in separate operations, to a copy material, for example copy paper, which passes through the nip with the toner image. After the transfer and fusing operations, the dielectric surface is treated to remove any residual toner and charge.

Various forms of apparatus have been developed to produce the pattern of charge, perhaps the most successful being apparatus in which charged particles are generated in the air by applying high frequency alternating voltage between electrodes separated by a dielectric material. In particular, U.S. Pat. No. 4,155,093 issued May 15, 1979 to Fotland et al discloses the generation of charged particles by breakdown of a gas by an electrical field between conducting electrodes separated by a dielectric. By applying a varying electrical voltage between these electrodes, which is large enough to overcome the critical electric field, breakdown of the surrounding gas takes place and a pool of charged particles of both polarities is generated. A charged particle current of desired polarity is then created by a combination of an inner electrical field created by the electrodes and an external field between the breakdown site and a dielectric surface so that the selected particles are transferred to the dielectric surface to form a latent image.

This patent further discloses a dot matrix charged particle generator for the formation of characters by dot matrix electrical charges on a dielectric surface. The generator comprises a sheet of dielectric material provided with electrodes on opposite sides thereof, the electrodes on the side of the dielectric material nearest the surface on which the charge is to be deposited having edge structures defined by apertures from which the charged particles can be discharged, in the above described number, on to complementary areas of the dielectric surface.

A further development of this principle is disclosed in U.S. Pat. No. 4,160,257, issued July 3, 1979 to Carrish, which describes a charged particle generator in which, in addition to a high frequency potential applied between a first driver electrode and a second finger electrode separated by a dielectric member, a lesser constant potential is applied to a screen electrode, which is separated from the finger electrode by a second dielectric member. This use of the screen electrode has been found to improve the quality of the image produced by providing screening oppositely charged particles and by performing an electrostatic lensing action which tends to focus the charged particle beam or current.

In the embodiments described and illustrated in these two patents, the edge structures are defined by rows of individual apertures provided in the finger electrodes at locations where the electrodes on the opposite sides of the dielectric intersect. In practice, slotted electrodes have also been used as described in U.S. Pat. No. 4,679,060, issued July 7, 1987 to McCallum et al.

One of the problems associated with print cartridges utilizing such slotted or apertured finger electrodes has been the low efficiency of charge transfer from the charge creation site to the image receiving material. It has been revealed that this is due, to a large extent, to the divergent nature of the electrostatic field created by the electrodes. A very strong electric field between the finger and driver electrodes penetrates through the openings in the finger electrodes towards the image receiving surface and therefore charged particles moving in this direction are diverged to the sides. As a result many of the particles do not reach the image receiving surface. Also, where the cartridge is provided with a screen electrode, the misdirected charged particles may collect behind this third electrode where whey are thought to be one of the factors involved in the creation of build-ups of material behind the screen electrode. Thismaterial, known as corona by-products, affects the quality of the image produced and may, in time, necessitate replacement of the cartridge.

SUMMARY OF THE INVENTION

It is an object of the present invention to provide a print cartridge with increased efficiency by directing a greater portion of the charged particles created towards the image receiving surface by altering the shape of the electric field created by the electrodes.

According to one aspect of the present invention there is provided a print cartridge for use in charge transfer imaging comprising first and second electrodes on opposite sides of a dielectric layer. The first electrodes extend in a first direction and the second electrodes extend in a second direction, the second electrodes defining edge structures at locations where the first and second electrodes cross. At each of these locations, each second electrode further defines openings surrounding the respective edge structures, the openings extending through the electrode to the dielectric layer and spaced from the respective edge structures. A dielectric material seals the openings.

By selectively energizing electrodes by use of, for example, multiplexing, charged particle creating electrical discharges are produced at the edge structures. A current of charged particles of desired polarity is extracted from these charge generating locations by applying a suitable electrical field. The current impinges on a dielectric surface provided spaced from the cartridge to form a latent image thereon.

The provision of preferably a plurality of sealed openings spaced from the edge structures allows the electric field created by the electrodes to penetrate into the space between the second electrode and the image receiving surface, thus causing the electric field penetrating in said space at the edge structures to focus the charged particle current. Thus, a large proportion of the charged particles created are directed towards, and impinge upon, the image receiving surface.

In a further aspect of the invention, focusing of the charged particle current is achieved by providing third electrodes spaced from the second electrode. By maintaining the third electrodes at a suitable potential a focusing electric field can be produced.

In yet another aspect of the present invention, the electric field is focused by use of a dielectric layer composed of dielectric materials having differing dielectric constants at the charge particle generating locations where the dielectric layer is exposed. Adjacent the edge structures the dielectric layer has a relatively high dielectric constant, the dielectric constant decreasing with distance from the edge structures. The presence of material having a higher dielectric constant adjacent the edge structures permits greater penetration of the electrode electric field adjacent the edge structures than at the areas of low dielectric constant, thus flattening or focusing the penetrating electric field.

BRIEF DESCRIPTION OF THE DRAWINGS

These and other aspects of the invention will become apparent with reference to the accompanying drawings, in which.

DETAILED DESCRIPTION OF PREFERRED EMBODIMENTS

Figure 1:
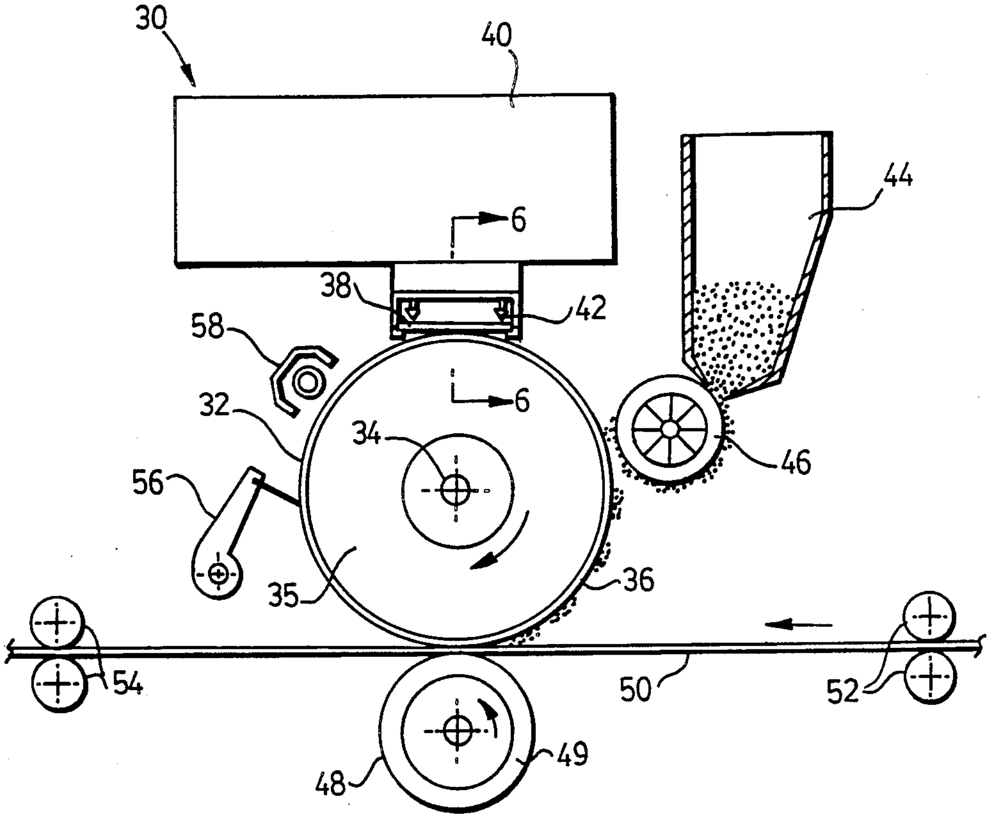
FIG. 1 is a diagrammatic side view of charge transfer imaging printer incorporating a print cartridge in accordance with a preferred embodiment of the present invention.

Reference is made firstly to FIG. 1 which shows somewhat schematically a printer 30 incorporating a preferred embodiment of a print cartridge according to the present invention. This printer is illustrated primarily to demonstrate a preferred environment for the invention but other printers or charge transfer apparatus could benefit from the use of the invention.

A cylinder or drum 32 is mounted for rotation about an axis 34 and has an electrically conductive core 35 coated in a dielectric layer 36 capable of receiving a charge image from a print cartridge 38 driven by an electronic control system 40 and connected to the cartridge 38 by electrical connectors 42. As the drum rotates in the direction shown, a charge image is created by the cartridge 38 on the outer surface of the dielectric layer 36 and comes into contact with toner supplied from a hopper 44 by a feed mechanism 46. The resulting toner image is carried by the drum 32 towards a nip formed with a pressure roller 48 having a compliant outer layer 49 positioned in the path of a receptor such as a paper sheet 50 which enters between a pair of feed rollers 52. The pressure in the nip is sufficient to cause the toner to transfer to the paper sheet 50 and, because the axes of the drum 32 and roller 48 lie at an angle to one another, the toner will be fused to the receptor. The paper leaves the printer 30 between a pair of output rollers 54.

After passing through the nip between the cylinder 32 and the roller 48, any toner remaining on the surfaces of the dielectric layer 36 is removed by a scraper blade assembly 56, and any residual charge remaining on the surface is neutralized by a discharge head 58 positioned between the scraper blade assembly 56 and the cartridge 38.

Figure 2:
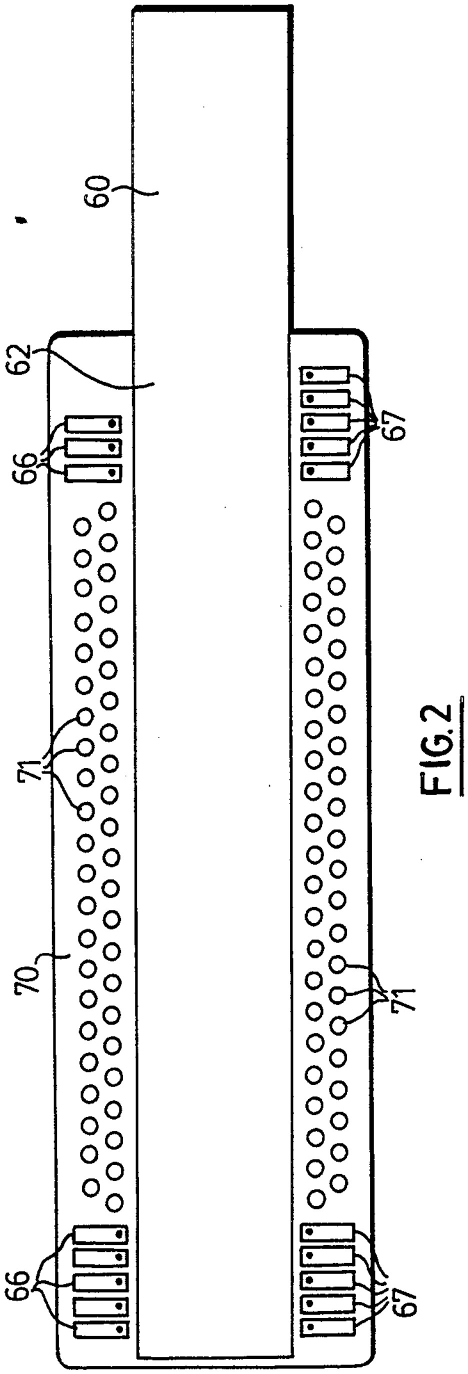
FIG. 2 is a view from above the cartridge.
Figure 3:
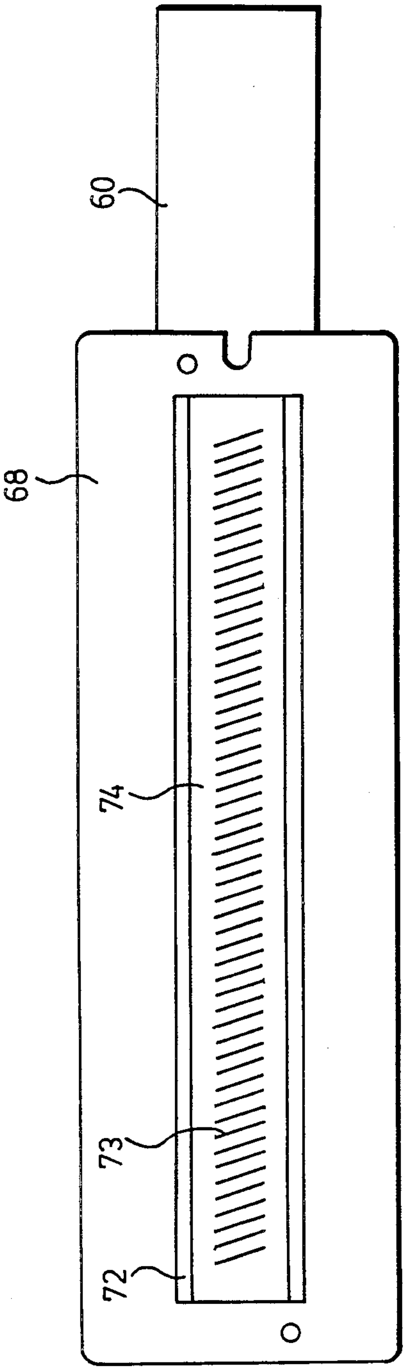
FIG. 3 is a view from below the cartridge.

Reference is next made to FIG. 2, which is a top view of the print cartridge 38. In this view, the cartridge is shown as it would appear looking down on the printer of FIG. 1, and has a handle 60 extending beyond the active part of the cartridge for engaging the cartridge in the printer. The handle is an extension of a rigid spine 62 of aluminum which extends beyond the cartridge. End contacts 66, 67 for driver electrodes can be seen extending to either side of the spine 62 supported by a printed circuit board 70. Further, intermediate, elongate finger electrode contacts 71 also extend to either side of the spine, though they are sandwiched between a base member or bottom board 68 (better seen in FIG. 3) and the printed circuit board 70 and are normally only visible through contact apertures in the board 70 for receiving ends of the connectors 42 (FIG. 1). The bottom board 68 has a central slot 72 positioned about rows of small apertures 73 in a screen electrode 74.

The general arrangement of the laminates forming the cartridge will be described with reference to FIG. 4, which is drawn from below the cartridge. The board, or substrate 70 (FIG. 2), is of dielectric material such as glass reinforced epoxy and has printed on its underside a number of driver electrodes or drive lines, indicated collectively by the numeral 78. The driver electrodes 78 terminate at portions (not seen) which are connected to inner ends of the contacts 66 (FIG. 2) and are parallel to and separated by a strip of dielectric 82, typically mica, from finger electrodes 84. Each of these finger electrodes defines individual aperture sites 83 each of which has a central opening 86 (which may also be a grouping of small openings) and surrounding sealed openings 85 containing dielectric material. The finger electrodes extend from the elongate finger electrode contacts 71 (FIG. 2) to terminate in a support piece 87 for maintaining the finger electrodes in relationship to one another during cartridge manufacture. Also, the contacts 71 (FIG. 2) and support pieces 87 are formed integrally with the finger electrodes 84.

A dielectric separator layer 92 lies between the finger electrodes 84 and the screen electrode 74 and has parallel slots 94 in alignment with the sites 83 in the finger electrodes where, because of the edge structure of the sites, charged particle generation take place. In general each of the sites 83 defines edge structure at a discharge location where the finger and driver electrodes intersect or cross in plain view. The finger and driver electrodes extend in different directions to either side of the dielectric layer and the word 'intersection' will be used to define this cross-over location.

Figure 4:
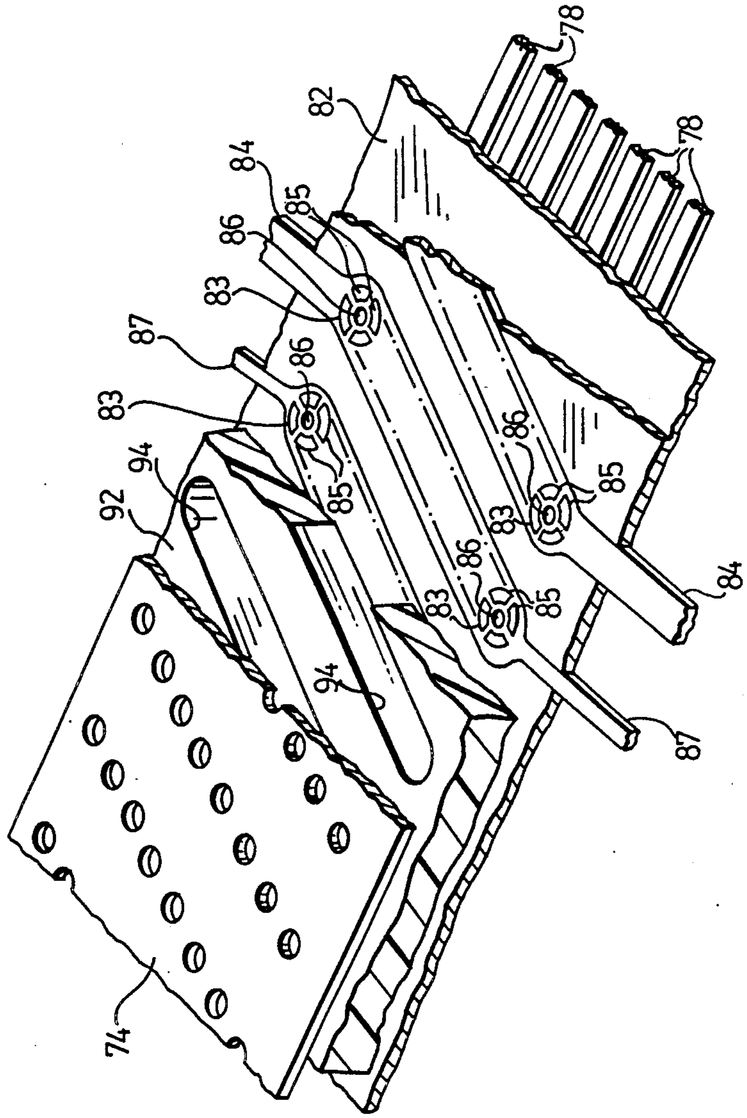
FIG. 4 is a perspective view of a portion of the print cartridge looking from the underside of the cartridge and showing layers in the construction.

The above description of FIG. 4 gives an overview of the arrangement of the various layers in the cartridge 38. Of course, it will be appreciated that layers of adhesive and the like have been omitted for clarity.

Figure 5:
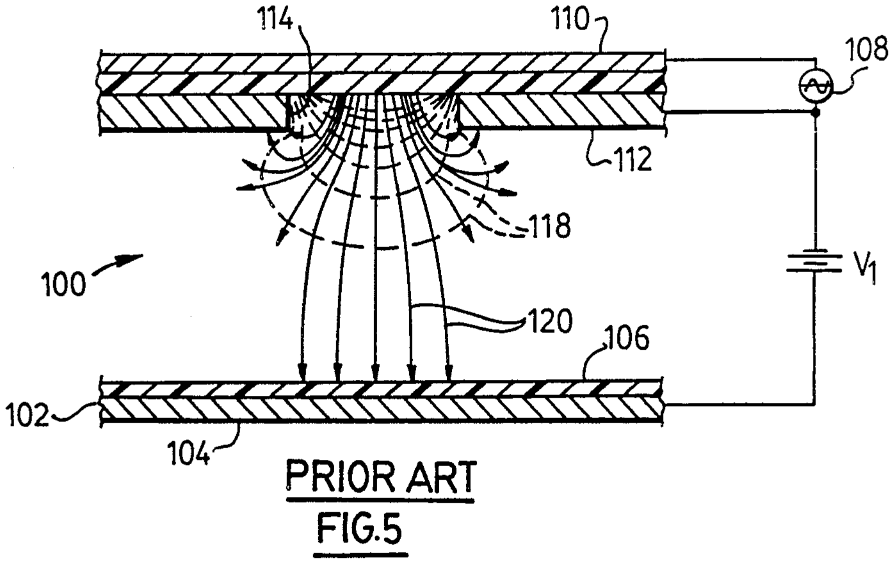
PRIOR ART FIG.5
FIG. 5 is a schematic sectional view of a prior art cartridge corresponding to a portion of a view taken generally on line 6—6 of FIG. 1, and drawn to a larger scale, the view also including a schematic representation of the electrical connections for the cartridge and a portion of a print drum, and illustrating the trajectories of charged particles.

Reference is now made to FIG. 5 which shows a somewhat schematic view of what would be seen in a sectional view of a prior art cartridge 100 at a location where a driver electrode and a finger electrode intersect. A portion of a print drum 102, including a conductive core 104 and dielectric layer 106, is also shown.

As is now conventional in this art, an alternating potential, from a source 108, is applied between the driver and finger electrodes 110, 112 in combination with a bias potential $V_1$ to create an electrical discharge in apertures such as aperture 114 in the finger electrode. Charged particles formed at edge structures about the aperture 114 are then subjected to an electrical field which causes them to form a charged particle current which is intended to impinge on dielectric layer 106 and form a latent image.

Control of the various electrodes to produce a desired image may be achieved by multiplexing, as described, for example, in U.S. Pat. No. 4,267,556 issued May 12, 1981 to Fotland et al, or in response to a digital input signal representing successive raster scan lines, as described, for example, in U.S. Pat. No. 4,494,129 issued Jan. 15, 1985 to Gretchev.

As the larger potential is applied between the driver and finger electrodes 110, 112, the electric field produced by the electrodes penetrates through the aperture 114 and predominates within the cartridge as shown by lines of equipotential 118. Due to the convex shape of this field particles formed in the aperture 114 follow divergent paths, as represented by field lines 120, so that only a small proportion of particles will reach the dielectric layer 106 to form an image thereon.

It is also noteworthy that the provision of a single aperture, and thus a single discharge zone, leads to unpredictable and variable image or dot production, due to the uncertainty of discharges occurring during a cycle in the applied alternating potential, and the uncertainty of the location of the origin of the discharge in the aperture.

Figure 6:
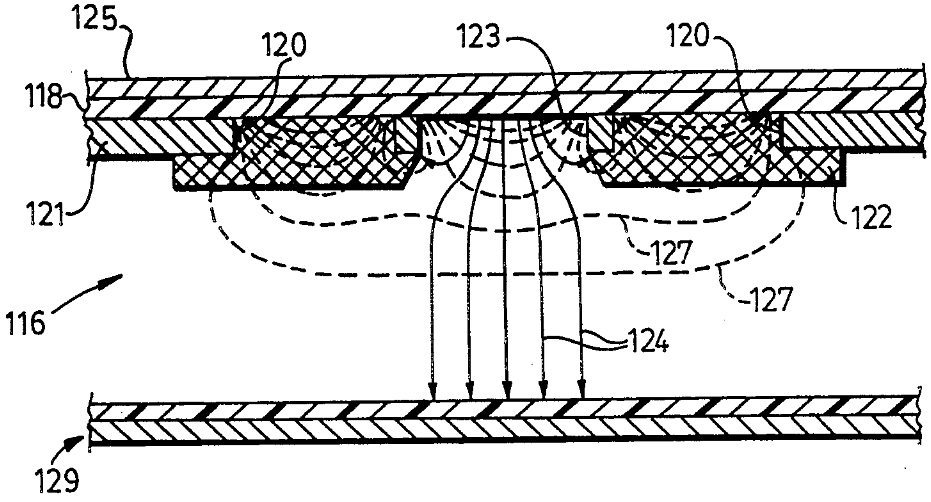
FIG. 6 is a view similar to FIG. 5 and showing the present cartridge.

Reference is next made to FIG. 6 which shows a view, similar to FIG. 5, of a cartridge 116 in accordance with a preferred embodiment of the invention, and which is intended to overcome these problems. In this view it will be noted that the cartridge is of conventional configuration, apart from the provision of a plurality of apertures or blind holes 120 in a finger electrode 121 surrounding an aperture 123 at the crossover location of a driver electrode 125 and the finger electrode 121. The shapes of the holes 120 can be seen more clearly in FIG. 4. These blind holes 120 extend through the electrode 84 to a dielectric layer 118 and are filled with dielectric material 122 which optionally also covers some of the finger electrode 121. If desired, the layer of dielectric material 122 may also act as a spacer or separator layer for a third or screen electrode (not shown in FIG. 6) which is commonly used in the art. (See for instance the aforementioned U.S. Pat. No. 4,160,257).

The apertures 120 enable the electric field between the driver and finger electrodes 125, 121 to penetrate into the space between the cartridge 116 and print drum 129 as represented by field lines 124 because lines of equipotential 127 are shaped by the presence of surrounding apertures 120 and dielectric 122 to lie essentially at right angels to the desired direction for the field lines. (Compare FIGS. 5 and 6 in which the apertures 114 and 123 are of similar size, typically 6 mil. dia.). Charge particle current is forced into a focused beam and a higher proportion of the charged particles produced reach the print drum. As well as increasing the efficiency of the cartridge in this manner, the presence of the focused beam of charged particles can also substantially reduce the number of particles impinging inside the cartridge. In conventional cartridges the trapped or misdirected charged particles are thought to contribute to aging effects which can affect the operation of the cartridge.

Figure 7:
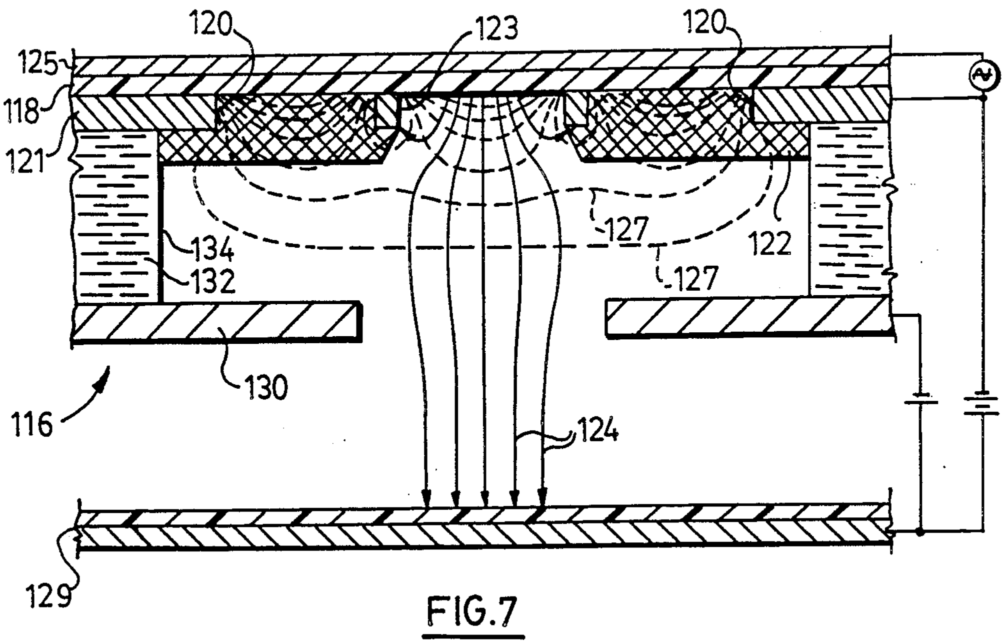
FIGS. 7–13 are views similar to FIG. 6 of cartridges in accordance with further embodiments of the present invention.

A futher advantage of this configuration of the cartridge is illustrated in FIG. 7 in which parts corresponding to those described with reference to FIG. 6 are given the same numerals. In this embodiment a screen electrode 130 is added, separated from the finger electrode 121 by a dielectric spacer 132 having an opening 134. Utilizing this configuration of cartridge and voltage biasing as indicated, the charged particle current beam is almost laminar and by altering the potential applied to the screen electrode it is possible to vary the beam diameter and thus vary the diameter of the resulting printed dot. With this facility, image definition is improved to a level not normally possible with the configurations such as those disclosed in U.S. Pat. No. 4,160,257.

Figure 8:
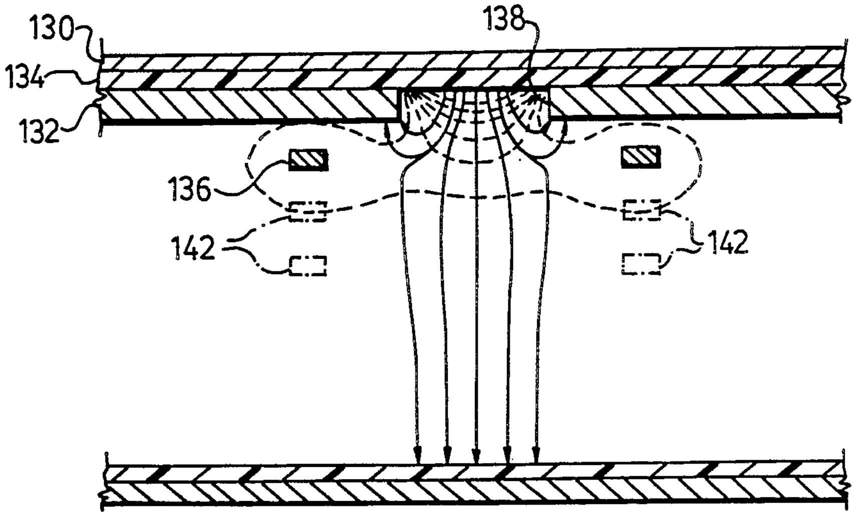

Reference is next made to FIG. 8 of the drawings which illustrates a different structure for improving and focusing the charged particle current. In addition to a driver electrode 130 and an apertured finger electrode 132 separated by a dielectric 134, a third electrode 136 is positioned around the edge of the electrode aperture 138 and spaced from the finger electrode 132. The electrode 136 may be encapsulated in dielectric if desired or simply spaced from the electrode 132 by a layer of dielectric. By applying a suitable potential to the third electrode 136, the electric field produced by this electrode will act to contain the penetrating electric field from the driver and finger electrodes. Further electrodes represented in ghost outline 142 may also be provided if further focusing is needed.

Figure 9:
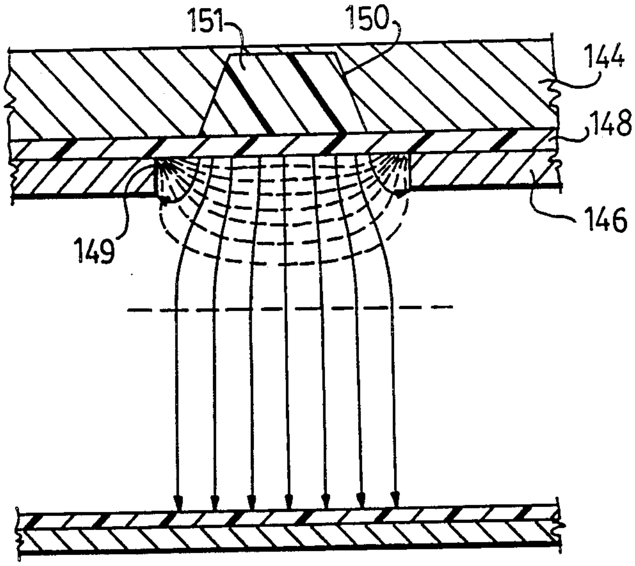

Yet another embodiment of the invention is shown in FIG. 9 in which a configuration of driver and finger electrodes 144, 146 is provided to reduce the penetration of the electric field beyond a separating dielectric 148 in the middle of an aperture by providing a hollow 150 in the driver electrode 144 slightly smaller in size than the aperture 149 in the finger electrode 146. The hollow is filled with a dielectric material 151.

Figure 10:
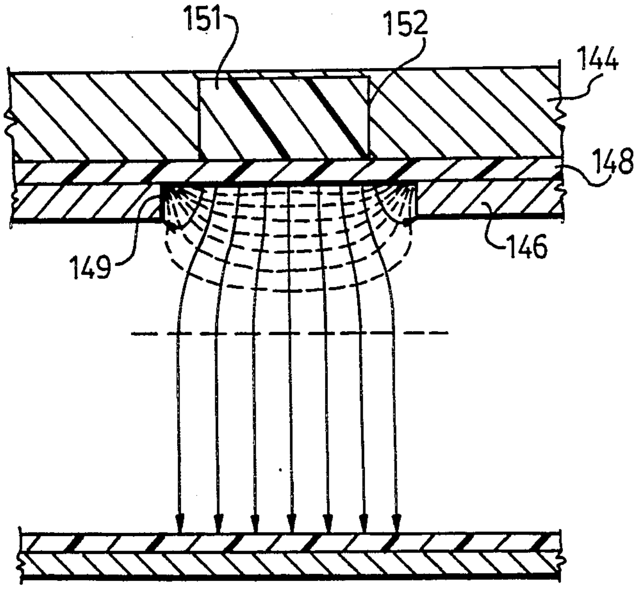
Figure 11:
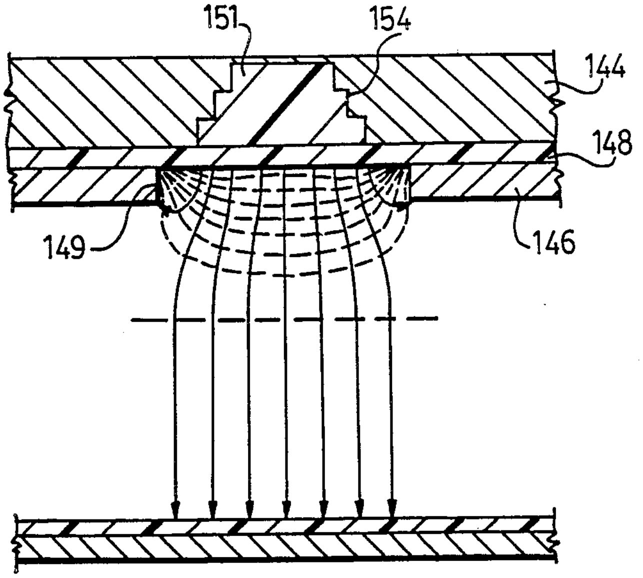

While the frustro-conical shape of hollow shown in FIG. 9 is preferred because it best contains the electric field, straight or step sided hollows 152,154 may be used, as illustrated in FIGS. 10 and 11. Also, the hollow can be a hole right through the driver electrode. However a frustro-conical hollow with a 67 degree angle to the face of the electrode has been found to be best.

Figure 12:
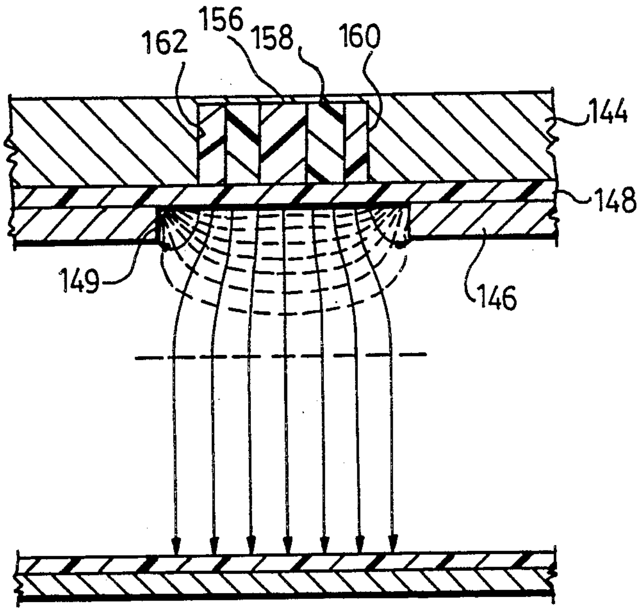

In the examples illustrated in FIGS. 9, 10 and 11 the sealing of the hollow has been accomplished by use of a single dielectric. Alternatively, a set of concentric dielectrics 156, 158, 160 with decreasing dielectric constants towards the centre of the hollow 162 may be utilized, as illustrated in FIG. 12 of the drawings. The dielectrics 152 with higher dielectric constants at the outer edge of the hollow permit greater penetration by the electrode electric field, resulting in a flattened electric field pattern.

Figure 13:
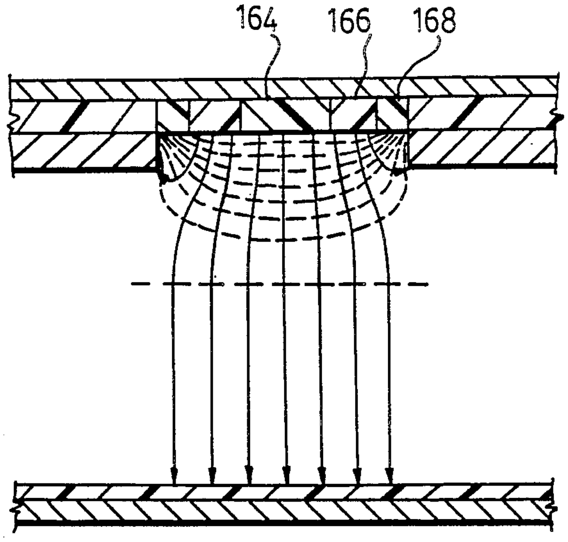

A further embodiment is illustrated in FIG. 13 which includes an arrangement of rings of dielectric material 164, 166, 168 in a cartridge with driver electrodes of conventional configuration to flatten the electric field. The materials are arranged with the highest dielectric constant at the periphery and the lowest at the centre.

Thus it can be seen that the configurations of electrodes disclosed above allow the creation of a homogenous or focusing electrode electric field which produce a recti-linear or focused charged particle current. As a result of this, the cartridges may operate with greater efficiency, a decrease in damage to the cartridge by misdirected or diverging charged particles, and the possibility of easily changing the size, or diameter, of the printed dots.

It will be clear to those skilled in the art that the above described cartridges are of exemplary configuration and that various modifications and changes may be made within the scope of the present invention. In particular the numbers of encircling apertures, of dielectric rings in the hollow of the driver electrode or in the separator dielectric may be varied and embodiments created using combinations of features shown in the foregoing embodiments.

We claim:

1. In a print cartridge for use in charge transfer imaging having a layer of dielectric material, a plurality of first electrodes extending in a first direction along one side of the dielectric layer, a plurality of second electrodes extending in a second direction along the opposite side of the dielectric layer, and edge structures provided in the second electrodes disposed at locations opposite said first electrodes, the improvement comprising substantially surrounding the edge structures with a dielectric material inserted in each second electrode at each of said locations and spaced from the respective edge structures.

2. Apparatus as claimed in claim 1, in which the edge structures are defined by apertures in the second electrodes.

3. Apparatus as claimed in claim 2, in which the dielectric material is inserted in openings in the second electrode, the openings all being of similar shape.

4. Apparatus as claimed in claim 1, in which the dielectric material coats the faces of the second electrodes opposite the dielectric layer and about the openings.

5. Apparatus as claimed in claim 1, in which an apertured third electrode is provided spaced from the second electrode by an apertured second dielectric layer, the apertures in said third electrode being aligned with respective said edge structures.

6. In a print cartridge for use in charge transfer imaging having a layer of dielectric material, a plurality of first electrodes extending in a first direction along one side of the dielectric layer, a plurality of second electrodes extending in a second direction along the opposite side of the dielectric layer, and edge structures provided in said second electrodes disposed at locations opposite said first electrodes, the improvement comprising providing hollows filled with dielectric material in said first electrodes at said locations to effectively increase the thickness of the dielectric layer at the said locations.

7. Apparatus as claimed in claim 6, in which the hollows in the first electrodes are frustro-conical, widening towards the dielectric layer.

8. Apparatus as claimed in claim 6, in which the dielectric material is made up of several materials having different dielectric constants which decrease with distance towards the centres of the hollows.

9. Apparatus as claimed in claim 7, in which the dielectric material in said hollows is arranged in a series of concentric rings, each ring formed of a dielectric material, and the ring of material at the centre of the hollows having the lowest dielectric constant, and the ring of material furthest from the centre having the highest dielectric constant.

10. Apparatus as claimed in claim 6, in which respective apertured third electrodes are provided spaced from said second electrodes by an apertured second dielectric layer, the apertures in said third electrode coinciding with said edge structures.

11. In a print cartridge for use in charge transfer imaging having a layer of dielectric material, a plurality of first electrodes extending in a first direction along one side of the dielectric layer, a plurality of second electrodes extending in a second direction along the opposite side of the dielectric layer, and edge structures provided in said second electrodes disposed at locations opposite said first electrodes and exposing areas of the dielectric, the improvement comprising forming at least the exposed portions of the dielectric layer of dielectric materials having different dielectric constants, the dielectric material having the highest dielectric constant being located adjacent the edge structures.

12. Apparatus as claimed in claim 11, in which the edge structures are formed by apertures in the second electrodes and the exposed portions of the dielectric layer are formed of concentric rings of dielectric material extending through the thickness of the dielectric layer.

13. In a printer comprising support structure, a print cartridge mounted on the support structure and having a layer of dielectric material, first electrodes extending in a first direction along one side of the dielectric layer, second electrodes extending in a second direction along an opposite side of the dielectric layer, and edge structures provided in said second electrodes disposed at locations opposite the said first electrodes, a print drum supported on the support structure for receiving a charge image from the print cartridge, toner supply means mounted on the support structure for supplying toner to the print drum, feeding means mounted on the support structure for feeding an image receiving receptor to a nip formed between the drum and a pressure roller mounted on the support structure where toner images are transferred to the image receiving receptor, the improvement comprising substantially surrounding the edge structures with a dielectric material inserted in each second electrode at each of said locations and spaced from the respective edge structures.

14. In a printer comprising support structure, a print cartridge mounted on the support structure and having a layer of dielectric material, first electrodes extending in a first direction along one side of the dielectric layer, second electrodes extending in a second direction along an opposite side of the dielectric layer, and edge structures provided in said second electrodes disposed at locations opposite the said first electrodes, a print drum supported on the support structure for receiving a charge image from the print cartridge, toner supply means mounted on the support structure for supplying toner to the print drum, feeding means mounted on the support for feeding an image receiving receptor to a nip formed between the drum and a pressure roller mounted on the support structure where toner images are transferred to the image receiving receptor, the improvement comprising providing hollows filled with dielectric material in said first electrodes at said locations to effectively increase the thickness of the dielectric layer at the said locations.

15. In a printer comprising support structure, a print cartridge mounted on the support structure and having a layer of dielectric material, a plurality of first electrodes extending in a first direction along one side of the dielectric layer, a plurality of second electrodes extending in a second direction along the opposite side of the dielectric layer, and edge structures provided in said second electrodes disposed at locations opposite said first electrodes and exposing areas of the dielectric layer, a print drum supported on the support structure for receiving a charge image from the print cartridge, toner supply means mounted on the support structure for supplying toner to the print drum and feeding means on the support for feeding an image receiving receptor to a nip formed between the drum and a pressure roller mounted on the support structure, where toner images are transferred to the image receiving receptor, an the improvement comprising forming the exposed portions of the dielectric layer of dielectric materials having different dielectric constants, the dielectric material having the highest dielectric constant being located adjacent the edge structure.

16. A method of improving the image produced by a printcartridge for use in charge transfer imaging having a layer of dielectric material, a plurality of first electrodes extending in a first direction on one side of the dielectric layer, a plurality of second electrodes extending in a second direction on the opposite side of the dielectric layer, and edge structures provided in the second electrodes disposed at locations opposite the first electrodes, comprising substantially surrounding the edge structures with a dielectric material inserted in each second electrode at each of said locations and spaced from the respective edge structures.

17. A method of improving the image produced by print cartridge use in charge transfer imaging having a layer of dielectric material, a plurality of first electrodes extending in a first direction on one side of the dielectric layer, a plurality of second electrodes extending in a second direction on the opposite side of the dielectric layer, and edge structures provided in the second electrodes disposed at locations opposite the first electrodes, comprising hollows filled with dielectric material in said first electrodes at said locations to effectively increase the thickness of the dielectric layer at the said locations.

18. A method of improving image produced by print cartridge for use in charged transferred imaging having a layer of dielectric material, a plurality of first electrodes extending in a first direction on one side of a dielectric layer, a plurality of second electrodes extending in a second direction along the opposite side of the dielectric layer, and edge structures provided in the second electrodes disposed at locations opposite the first electrodes and exposing areas of the dielectric layer, comprising forming the exposed portions of the dielectric layer of dielectric materials having different dielectric constants, a dielectric material having the highest dielectric constant located adjacent the edge structures.

* * * * *